United States Patent [19]
Curtiss

[11] Patent Number: 5,856,870
[45] Date of Patent: Jan. 5, 1999

[54] SPECTROANALYTICAL SYSTEM

[75] Inventor: Lawrence E. Curtiss, Concord, Mass.

[73] Assignee: Foster-Miller, Inc., Waltham, Mass.

[21] Appl. No.: 833,671

[22] Filed: Apr. 8, 1997

[51] Int. Cl.$^6$ .................................. G01J 3/20; G01J 3/36
[52] U.S. Cl. .......................................... 356/328; 356/334
[58] Field of Search .................................. 356/328, 334; 385/37

[56] References Cited

U.S. PATENT DOCUMENTS

| | | |
|---|---|---|
| 3,414,355 | 12/1968 | Fastie et al. . |
| 4,469,441 | 9/1984 | Bernier et al. ........................ 356/316 |
| 4,595,833 | 6/1986 | Sting . |
| 4,798,954 | 1/1989 | Stevenson . |
| 4,852,967 | 8/1989 | Cook et al. . |
| 5,088,823 | 2/1992 | Smith, Jr. et al. . |
| 5,493,393 | 2/1996 | Beranek et al. ....................... 356/328 |

FOREIGN PATENT DOCUMENTS 58-140711  8/1982  Japan ....................................... 385/37

OTHER PUBLICATIONS

Microparts, "LIGA–Micro Spetrometer for IR–Gas Detection", Jan. 1996.

Microparts, "LIGA–Micro Spetrometer for Analysis and Color Measurement", Jan. 1996.

*Primary Examiner*—Vincent P. McGraw
*Attorney, Agent, or Firm*—Fish & Richardson P.C.

[57] ABSTRACT

A spectroanalytical system includes entrance aperture defining structure for receiving radiation to be analyzed along a first path; dispersion structure in the first path for spatially dispersing the radiation as a function of wavelength; exit aperture structure defining a non-elongate aperture for receiving radiation from the dispersion structure; detector aperture structure coupled to the exit aperture structure for detecting selected wavelengths of the dispersion radiation; and wedge-like conditioner structure disposed between the first path and between the dispersion structure and the entrance and exit aperture structures.

21 Claims, 5 Drawing Sheets

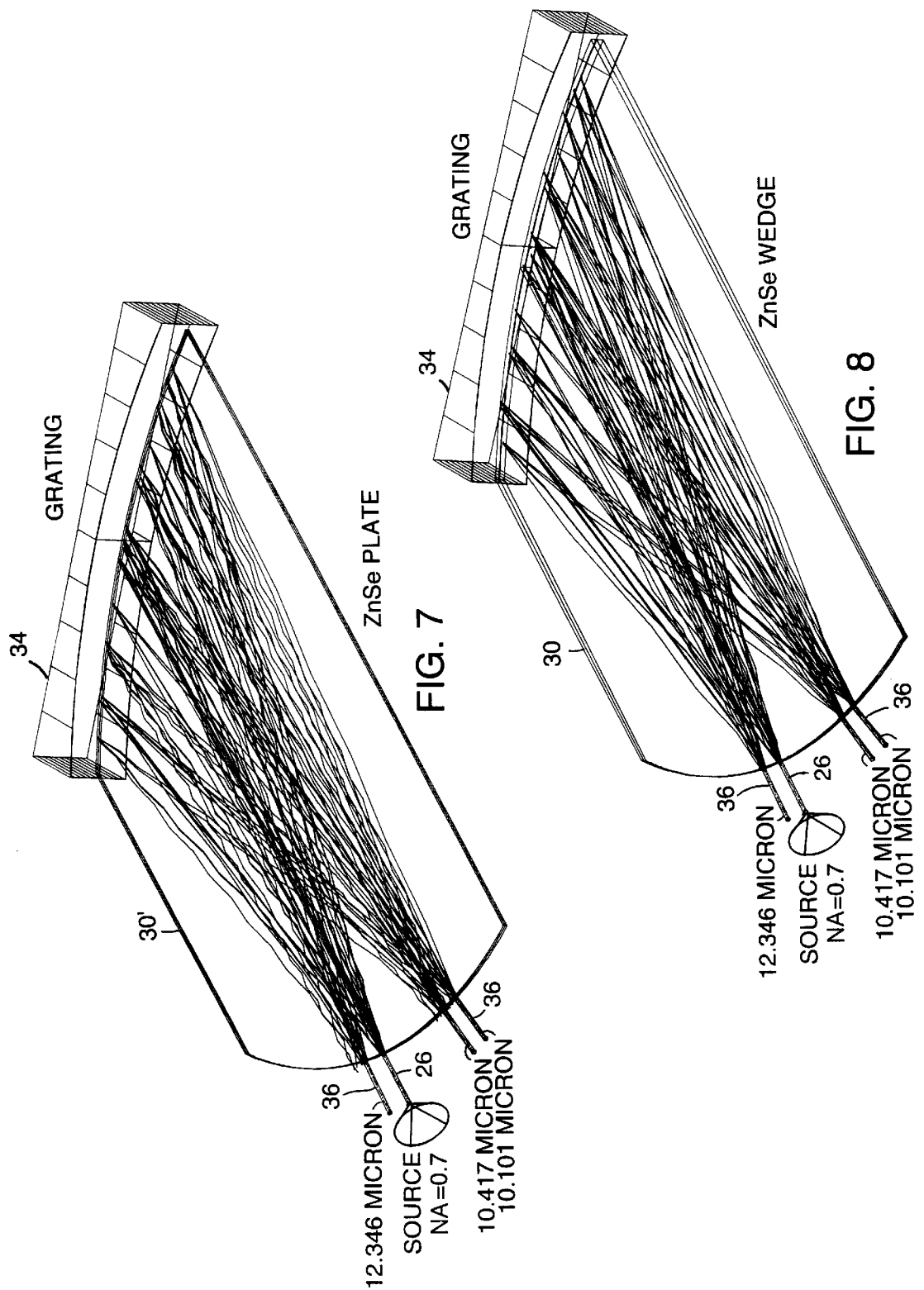

SPECTROANALYTICAL SYSTEM

Statement as to Federally Sponsored Research

This invention was made with Government Support under Contract No. F33615-96-C-2633 awarded by the Air Force. The Government has certain rights in this invention.

BACKGROUND OF THE INVENTION

This invention relates to spectroscopy and more particularly to spectroanalytical systems.

SUMMARY OF THE INVENTION

Spectroscopy is frequently employed in qualitative and quantitive analysis of materials. Infrared radiation detection techniques are frequently advantageous over spectroscopic techniques using radiation of shorter wavelength, such as visible or ultraviolet light. Among the desirable applications of spectroscopic monitoring techniques is the real time monitoring of process parameters in various fluids such as dairy products, contamination of fuels in engine lubricants, monitoring of anesthesia gases, and the like. In such applications, it is desirable that the analyzer be relatively compact and sturdy and with a minimum of moving parts.

In this disclosure, the term "numerical aperture" (NA) is used loosely to describe the cone of light incident at the entrance aperture. The numerical aperture is the sine of the half angle of the angular aperture. At intermediate numerical apertures, 0.15–0.35, systems using concave gratings with curved grooves of varying spacing or a concave grating combined with a conical mirror may be used to reduce astigmatism successfully. At large numerical apertures, 0.4 to 0.7, which are compatible with the numerical apertures of presently available optical fibers, these approaches failed to deliver the desired efficiency and resolution, especially the systems immersed in a low refractive index medium such as a gas.

In accordance with one aspect of the invention, there is provided a spectroanalytical system that includes entrance aperture defining structure for receiving radiation to be analyzed, dispersion structure for separating received radiation as a function of wavelength; detector structure for detecting specific portions of the dispersed radiation; and wedge-like optical conditioner structure between the entrance aperture defining structure and the dispersion structure for conditioning input radiation to provide improved efficiency and resolution.

In preferred embodiments, entrance and exit aperture structures define non-elongate (a height:width ratio of less than two) apertures that are defined by optical fibers. In particular embodiments, the optical fibers preferably have a high numerical aperture as found in chalcogenide glasses such as arsenic sulfide or arsenic germanium selenide, a heavy metal fluoride glasses such as a mixture of zirconium, barium, lanthanum and aluminum fluorides, or polycrystalline or single crystal material such as thallium bromoiodide or cesium iodide. Preferably, the optical fibers have a diameter of at least about fifty micrometers but less than one millimeter. Although the optical conditioner may be in the form of two converging planar plates with a low refractive index medium such as a gas between the plates, better performance is achieved when the fiber cores and optical conditioner have substantially matching refractive indices greater than 1.7.

In an analyzer for monitoring the presence of jet fuel in lubricant on a real time basis, output optical fibers are located to monitor peaks at 805 $CM^{-1}$, 768 $CM^{-1}$, 739 $CM^{-1}$, and 700 $CM^{-1}$. Those peaks of the fuel spectral curve fall between peaks on the spectral curve of fresh synthetic ester based lubricant so that monitoring of peaks at those wave numbers can be used to detect the presence of jet fuel in the ester lubricant on a real time basis.

The system allows analyzers to be tailored to specific characteristics of process parameters being monitored. In another embodiment, for monitoring the quality of fluid milk, signals at wave numbers ranging from 1050 to 2900 $CM^{-1}$ may be monitored; and other wave numbers may be monitored for specific different applications.

In particular embodiments, the analyzer is a compact sturdy, polychromator device with no moving parts and is housed in a chamber of less than one-half cubic foot volume.

BRIEF DESCRIPTION OF THE DRAWING

Other features and advantages of the invention will be seen as the following description of particular embodiments progresses, in conjunction with the drawings, in which:

FIGS. 7 and 8 are comparison ray traces for a parallel-surface-plate light guide and a wedge-like conditioner, respectively.

DESCRIPTION OF PARTICULAR EMBODIMENTS

Figure 1:
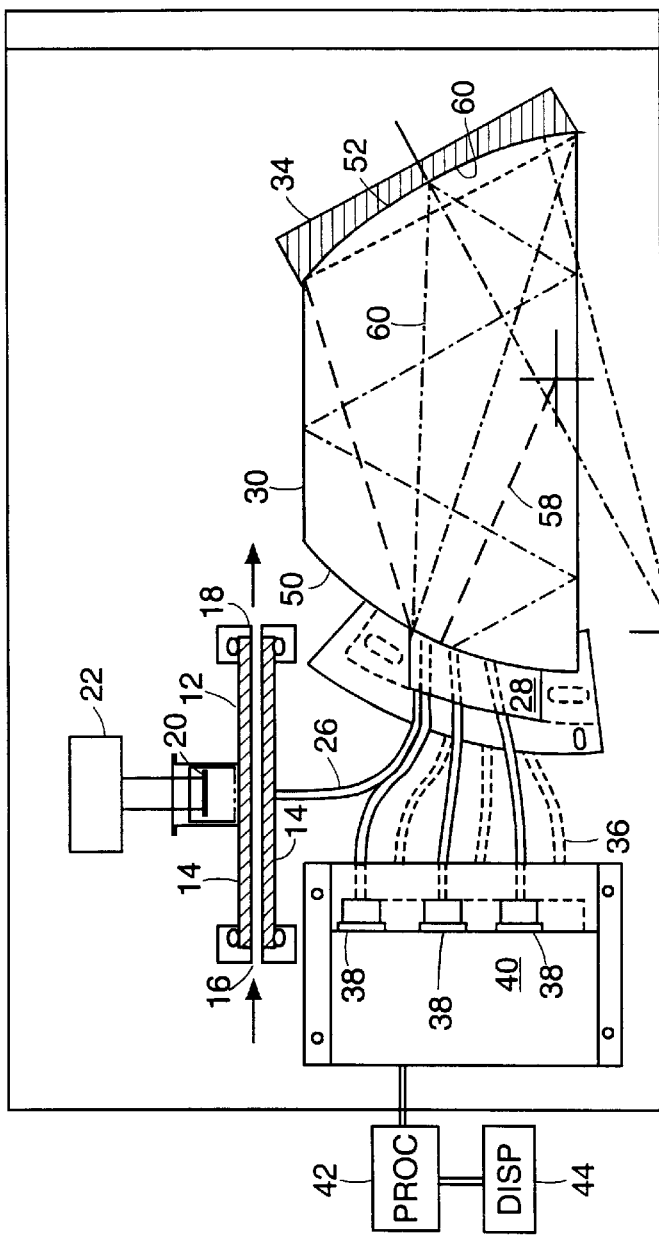
FIG. 1. is a diagrammatic top view of a spectrometer in accordance with the invention.
Figure 2:
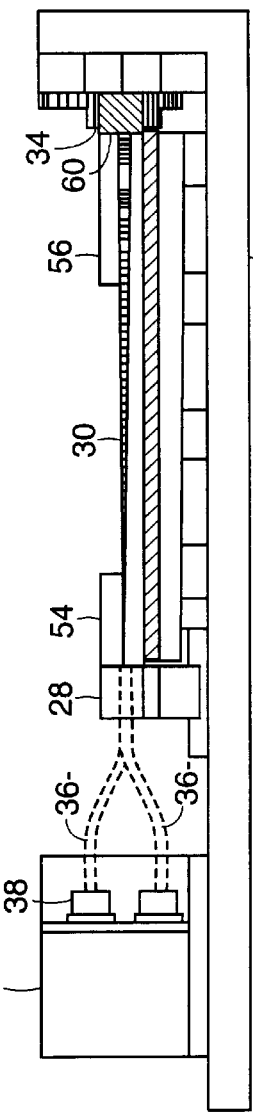
FIG. 2 is a side view of the spectrometer shown in FIG. 1.
Figure 3:
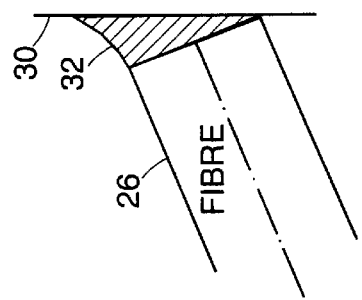
FIG. 3 is a diagrammatic view of the coupling between the conditioner and the optical fiber.
Figure 4:
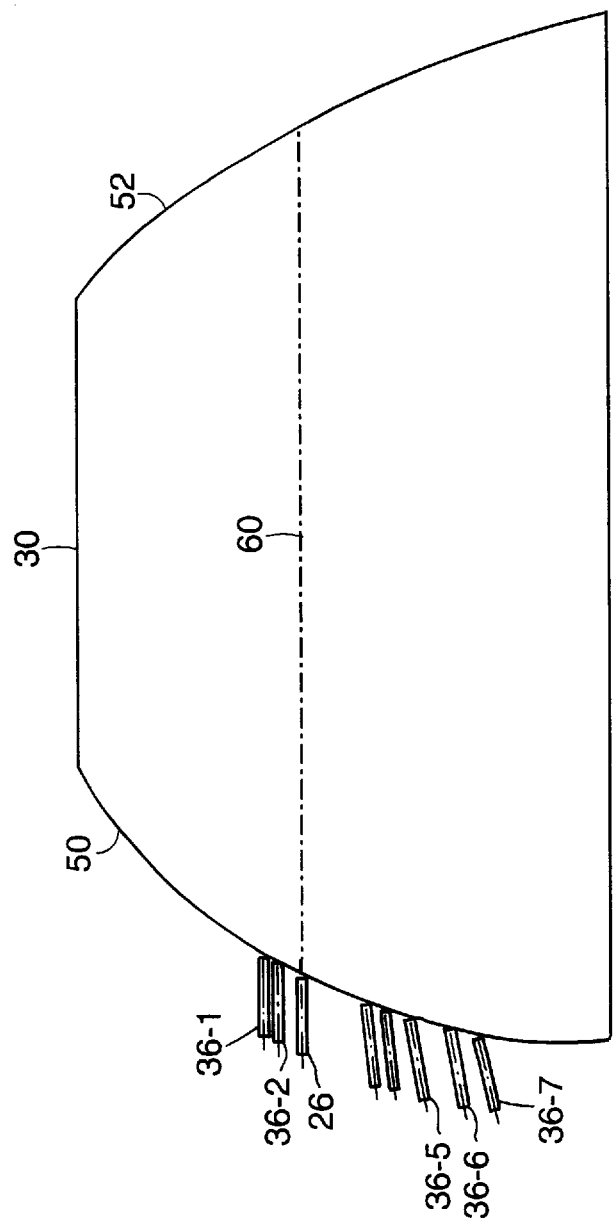
FIG. 4 is a top view of the optical conditioner structure employed in the embodiment shown in FIGS. 1 and 2.

With reference to FIGS. 1 and 2, the analyzer includes base 10 that has a length of about twenty centimeters and a width of about ten centimeters. Mounted on base 10 is analytical chamber 12 formed between zinc selenide plates 14 with parallel inner surfaces spaced one hundred micrometers apart, and inlet port 16 and outlet port 18 for flowing a sample to be analyzed through chamber 12. A beam of radiation from mid-IR source 20, as pulsed by driver circuit 22 at a frequency of about ten Hertz, is passed through analysis cell 12 to 0.75 millimeter diameter core coupling fiber 26 that is mounted in support 28.

Chalcogenide coupling fiber 26 is coupled to wedge conditioner 30 with index matching filler glass 32 that has an index of 2.4 that couples fiber 26 to zinc selenide optical conditioner 30 (that has an index of about 2.4). Similarly coupled with similar filler glass to wedge conditioner 30 is reflective grating 34. Also secured in mount 28 and coupled to wedge conditioner 30 with filler glass 32 are output fibers 36-1-7 (mounted at 10.1010 microns, 10.417 microns, 2.747 (4th order) microns; 2.824 (4th order) microns; 2.875 (4th order) microns; 12.346 microns; and 3.174 (4th order) microns, respectively that are coupled to corresponding detectors 38-1-7 mounted on detector assembly 40 for coupling to appropriate output apparatus such as a data processor 42 and a display 44.

Further details of wedge conditioner 30 may be seen with reference to FIGS. 4–7. Wedge conditioner 30 is of zinc selenide and has a length of about 120 millimeters and a width of about 60 millimeters, Focal curve end surface 50 has a radius of about 65 millimeters to which the input and output fibers 26, 36 are secured and optically coupled thereto; and end surface 52 has a radius of about 115 millimeters on which grating 34 is mounted and optically coupled. Wedge conditioner 30 tapers uniformly from a width at surface 50 of about ⅔ millimeter to a width at surface 52 ranging from 1.65 millimeter at its upper end to 2.22 millimeter at its lower end. Mounted on wedge conditioner 30 adjacent surface 50 is edge protector member 54 and mounted adjacent surface 52 are supports 56. The supports 56 and edge protector 54 are optically isolated with guide 30 by a gold coating on conditioner 30 in the areas to which they are bonded. The wedge gradient extends along axis 58 at 12° from the side of the wedge conditioner 30 as indicated in FIG. 1.

Grating 34 is a gold coated reflection grating on a substrate such as zinc selenide which matches the thermal expansion of wedge-like light conditioner 30. It has a width of ten millimeters, a length of seventy millimeters and a curved surface 60 of 115 millimeter radius that matches surface 52 of wedge conditioner 30 and is coupled to that surface by a low melting point infrared transmitting, index matching glass filler to provide good optical coupling between grating 34 and wedge conditioner 30. In one embodiment, grating 34 has a density of 750 grooves per millimeter; and in a second embodiment the grating has a density of 200 grooves per millimeters.

In one embodiment, the fiber cores have a diameter of ¾ millimeter; the output fiber end faces are arrayed along 65 mm radius focal surface, which is approximately the Rowland circle radius; the grating 34 is located 100 millimeters from the end of source fiber 26 along the source fiber axis 60; and the grating has a pitch angle of 30°.

Figure 5:
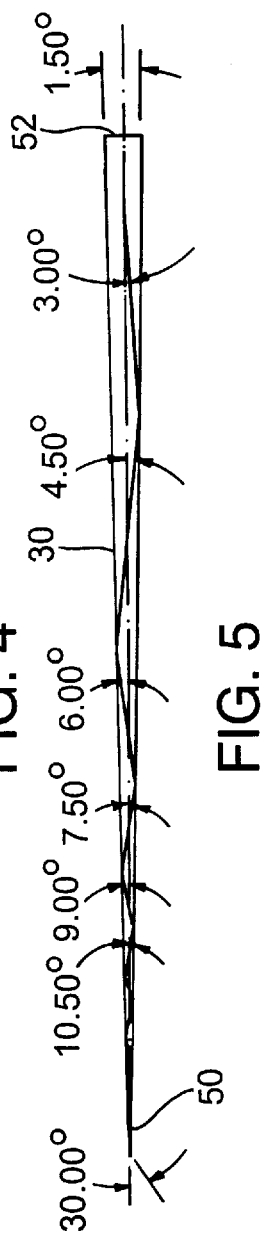
FIG. 5 is a side view of the optical conditioner structure shown in FIG. 4 aspects of showing internal reflection collimation and concentration.
Figure 6:
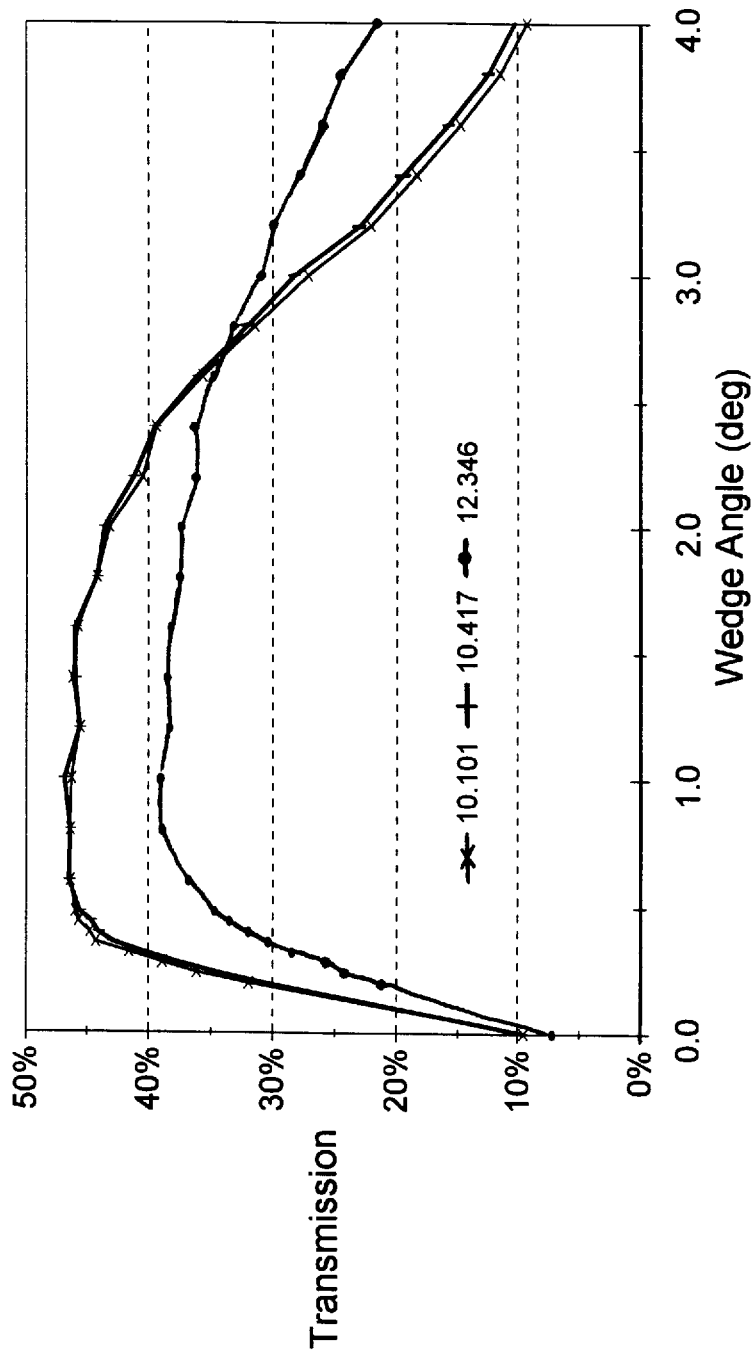
FIG. 6 is a graph of spectrometer transmission versus conditioner wedge angle.

Shown in FIG. 6 is a graph of transmission versus wedge angle at wavelengths of 10.1, 10.4 and 12.5 microns. It will be seen that transmission increases rapidly as the wedge angle increases from 0° (a waveguide with parallel surfaces) to about 0.4°; levels off over the next 1.5° and begins a general fall at higher wedge angles. Light from the source fiber 26 is increasingly "collimated" or made more parallel to the center plane of the wedge (as indicated in FIG. 5) as the wedge angle is initially increased, reducing the variation in the angle of diffraction caused by ray obliquity to the grating grooves.

The thickness of the waveguide 30 at the point where source fiber 26 is connected is 0.68 millimeter, slightly smaller than the 0.75 millimeter fiber core diameter. As the wedge thickness at the collection fibers 36-3-7 is greater, an increasing area of wedge focal surface 50 will lie outside the core of the output fiber such that transmission is reduced. In particular embodiments, the wedge angle may be a compromise between performance and mechanical robustness, and in this particular embodiment, a wedge angle of 1.5° is employed.

Figure 9:
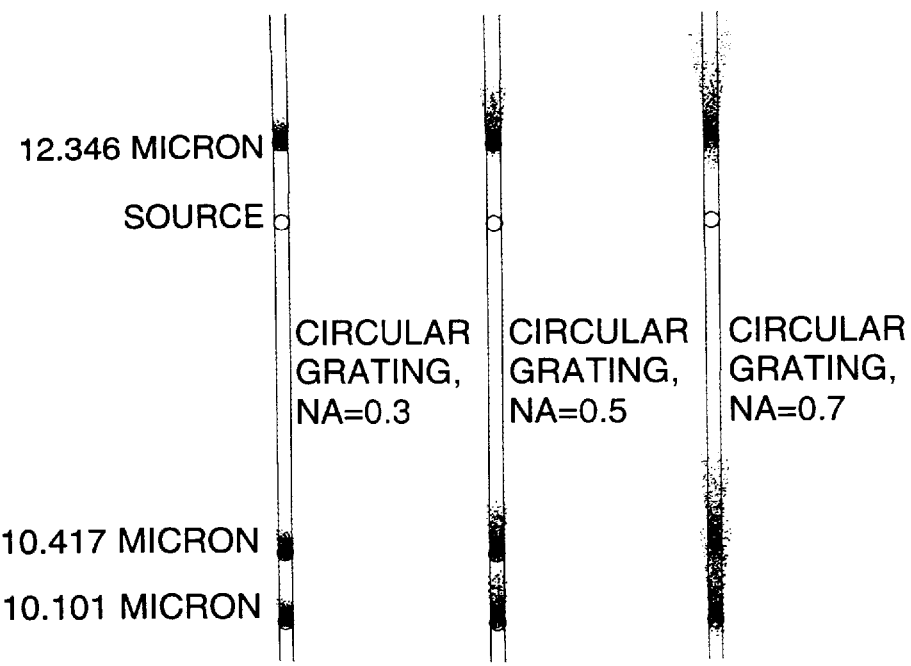
FIGS. 9 and 10 are spot diagrams for spectrometers that employ a parallel-surface-plate light guide and a wedge-like conditioner, respectively.
Figure 10:
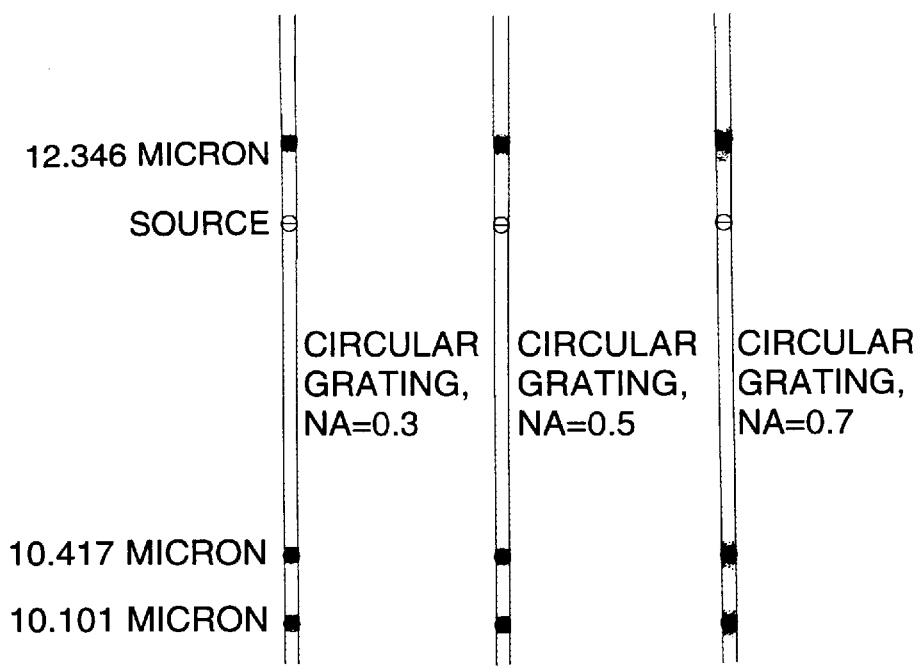

FIGS. 7 and 8 compare ray traces for a 0.7 numerical aperture input light cone with a parallel-surface-plate light guide 30' (FIG. 7) and a wedge conditioner (FIG. 8); and FIGS. 9 and 10 are spot diagrams for the parallel plate light guide of 30' FIG. 7 and the wedge conditioner 30 of FIG. 8.

The astigmatism correction advantage of using a wedge conditioner to reduce deviation from normal of the input light impinging on the grating 34 may be clearly seem by comparing the spot diagram for the parallel plate guide 30' of FIG. 9 with the wedge conditioner 30 spot diagram of FIG. 10.

While particular embodiments of the invention have been shown and described, various modifications will be apparent to those skilled in the art, and therefore, it is not intended that the invention be limited to the disclosed embodiment, or to details thereof, and departures may be made therefrom within the spirit and scope of the invention.

What is claimed is:

1. A spectroanalytical system comprising entrance aperture defining structure for receiving radiation to be analyzed along a first path;

dispersion structure in said first path for spatially separating (dispersing) said radiation as a function of wavelength;

detector structure for detecting said radiation spatially separated by said dispersion structure;

wedge-like optical conditioner structure disposed in said first path between said dispersion structure and said entrance aperture defining structure, said wedge-like optical conditioner structure having a first end surface to which said entrance aperture defining structure is optically coupled and a curved second end surface; and filler glass optically coupling said second end surface to said dispersion structure.

2. The system of claim 1 and further including exit aperture structure defining a non-elongate aperture for receiving radiation from said dispersion structure, and optical fiber structure coupled between said exit aperture structure and said detector structure.

3. The system of claim 2 and further including a plurality of said exit aperture structures, a corresponding plurality of said detector structures, and a corresponding plurality of optical fibers coupling said exit aperture structures to said detector structures.

4. The system of claim 1 wherein said wedge-like optical conditioner structure is of material that has an index of at least 2.0.

5. The system of claim 1 wherein said wedge-like optical conditioner structure has a taper between 0.4° and 3.0° wedge angle.

6. The system of claim 2 wherein said wedge-like optical conditioner has a first curved end surface to which said optical fiber structure is optically coupled.

7. The system of claim 2 wherein said optical fiber structure is selected from the group consisting of chalcogenide glasses such as arsenic sulfide and arsenic germanium selenide, heavy metal fluoride glasses such as a mixture of zirconium, barium, lanthanum and aluminum fluorides, and polycrystalline or single crystal material such as thallium bromoiodide or cesium iodide.

8. The system of claim 2 wherein said optical fiber structure has a core diameter of at least about fifty micrometers and less than one and one half millimeter.

9. The system of claim 2 wherein said optical fiber structure and said wedge structure have refractive indices greater than 1.7.

10. The system of claim 1 wherein said dispersion structure is a reflection grating.

11. The system of claim 10 and further including housing structure of less than one-half cubic foot volume in which said dispersion structure, said entrance and exit aperture defining structures and said wedge-like optical conditioner are disposed in fixed relation to one another.

12. The system of claim 11 wherein said wedge-like optical conditioner structure has a taper between 0.4° and 3.0° wedge angle.

13. The system of claim 12 and further including optical fiber structure coupled between said exit aperture structure and said detector structure.

14. The system of claim 12 and further including a plurality of said exit aperture structures, a corresponding plurality of said detector structures, and a corresponding plurality of optical fibers coupling said exit aperture structures to said detector structures.

15. The system of claim 14 wherein said wedge-like optical conditioner structure is of material that has an index of at least 2.0.

16. The system of claim 15 wherein said optical fibers are selected from the group consisting of chalcogenide glasses such as arsenic sulfide and arsenic germanium selenide, heavy metal fluoride glasses such as a mixture of zirconium, barium, lanthanum and aluminum fluorides, and polycrystalline or single crystal material such as thallium bromoiodide or cesium iodide.

17. The system of claim 16 wherein said optical fiber structure has a core diameter of at least about fifty micrometers and less than one and one half millimeter.

18. The system of claim 17 and further including housing structure of less than one-half cubic foot volume in which said dispersion structure, said entrance and exit aperture defining structures and said wedge-like optical conditioner are disposed in fixed relation to one another.

19. The system of claim 18 wherein said analyzer is adapted to monitor the chemical state of a lubricant on a real time basis.

20. The system of claim 10 and further including a plurality of said exit aperture structures.

21. The system of claim 10 wherein said filler glass and said wedge-like optical conditioner structure have substantially matching refractive indices greater than 1.7.

* * * * *

UNITED STATES PATENT AND TRADEMARK OFFICE
CERTIFICATE OF CORRECTION

PATENT NO.   : 5,856,870

DATED        : January 5, 1999

INVENTOR(S)  : Lawrence E. Curtiss

It is certified that error appears in the above-identified patent and that said Letters Patent is hereby corrected as shown below:

column 1, line 5, add after "Force" --and Contract No. DAAH01-95-R018 with the U.S. Army--

Signed and Sealed this

Twenty-seventh Day of July, 1999

Attest:

Q. TODD DICKINSON

Attesting Officer    Acting Commissioner of Patents and Trademarks